W. M. BAXTER.
REFRIGERATING AND HEATING SYSTEM.
APPLICATION FILED AUG. 20, 1915.
1,342,403.
Patented June 1, 1920.
2 SHEETS—SHEET 1.
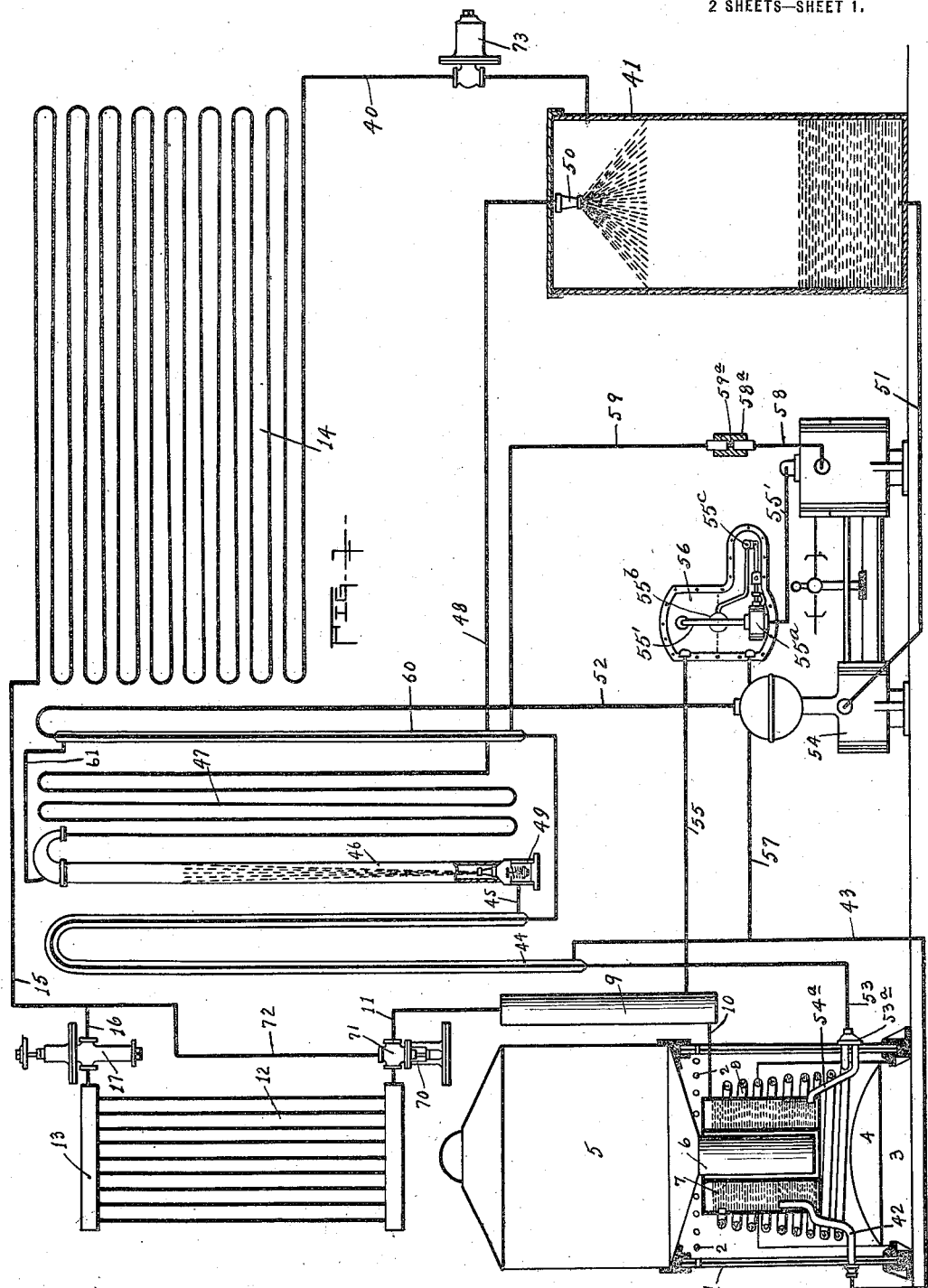

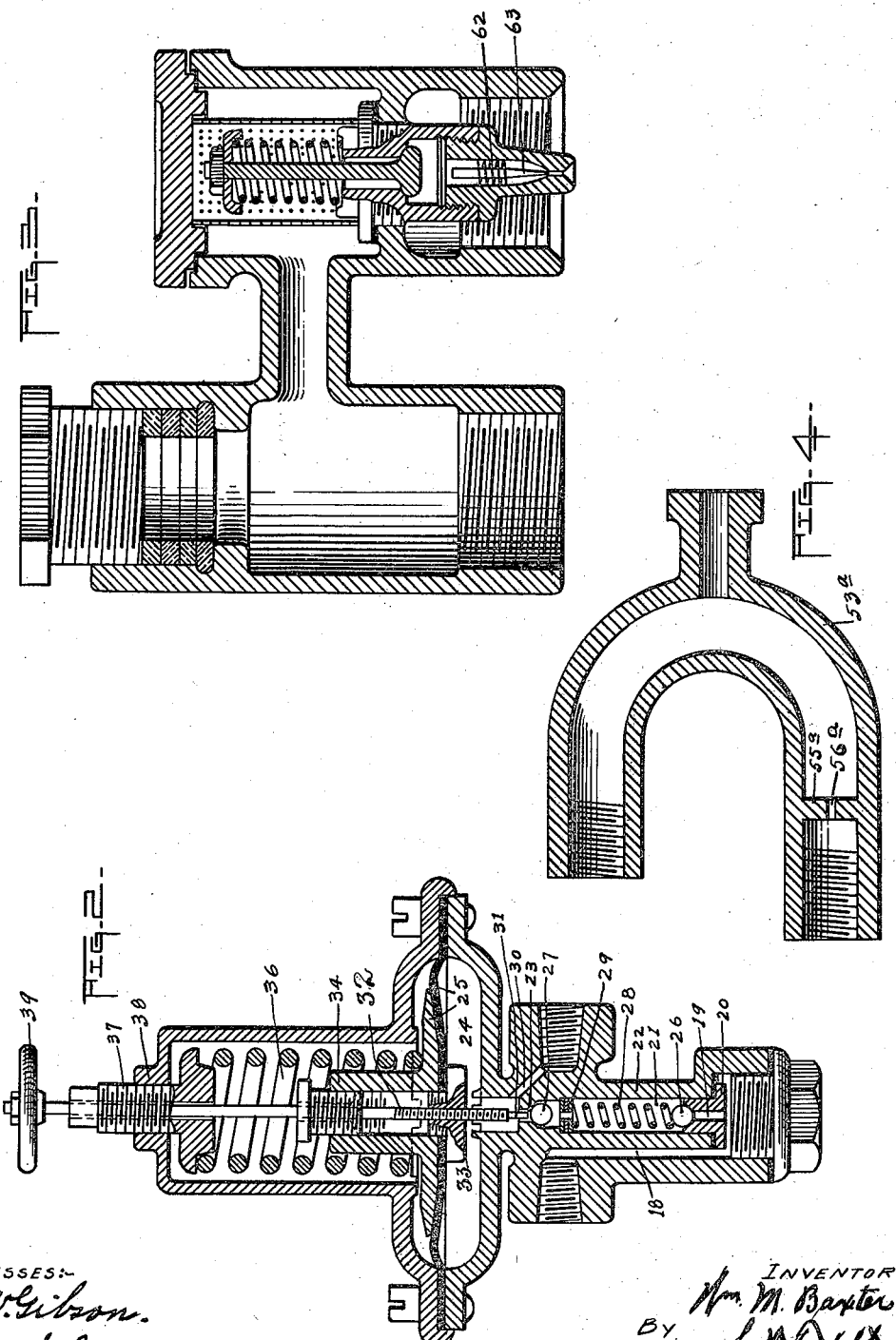

UNITED STATES PATENT OFFICE.

WILLIAM M. BAXTER, OF CHICAGO, ILLINOIS, ASSIGNOR, BY MESNE ASSIGNMENTS, TO NATIONAL REFRIGERATOR CAR COMPANY, OF CHICAGO, ILLINOIS, A CORPORATION OF DELAWARE.

REFRIGERATING AND HEATING SYSTEM.

1,342,403.  Specification of Letters Patent.  Patented June 1, 1920.

Application filed August 20, 1915. Serial No. 46,439.

*To all whom it may concern:*

Be it known that I, WILLIAM M. BAXTER, citizen of the United States, residing at Chicago, in the county of Cook and State of Illinois, have invented certain new and useful Improvements in Refrigerating and Heating Systems, of which the following is a specification.

My present invention relates in general to refrigerating and heating systems and the embodiment thereof disclosed herein is designed more particularly for use in connection with railway cars of the refrigerator type for the purpose of either heating or cooling the chamber in which the commodities are stored in order to maintain a uniform temperature therein irrespective of outside weather temperatures.

One of the primary objects of this invention is to provide a system of this character in which the rich liquor will be returned from the absorber to the generator by a pump which is operated by gas under pressure delivered from the generator and to control the operation of the pump by mechanism which in turn is controlled by the liquid level in the generator.

Another object of my invention is to transfer to the rich liquor *en route* to the generator a portion of the heat units of the exhaust gases from the power cylinder of the pump.

A further object is to thoroughly comingle the exhaust gases from the power cylinder of the pump with the weak liquor *en route* from the generator to the absorber so that these exhaust gases will be completely absorbed by the weak liquor before the absorber is reached.

Still another object is to provide thermostatically controlled means for converting the refrigerating coils of the system into heating coils when the temperature in the chamber in which the refrigerating coils are located falls below a predetermined point.

Other objects and advantages of this invention will be readily appreciated as the same is better understood by reference to the following description when considered in connection with the accompanying drawings.

Referring to the drawings—

Figure 1 is a view showing my system in elevation, with parts broken away to better illustrate detail structure and arrangement of parts;

Fig. 2 is a sectional elevation of the expansion valve;

Fig. 3 is a sectional elevation of a valve jet nozzle and detail pipe connections;

Fig. 4 is a detail sectional view of a return bend coupling and showing means of reducing the size of the opening through the coupling.

I shall now describe my invention and the structural parts and arrangements thereof effective for operation as a refrigerating system.

1 refers to a casing or housing for the heating chamber or compartment; 2 to plural perforations disposed circumferentially in the upper part and in the body of said casing; 3 is a base member and 4 is a grate. 5 is a magazine adapted to contain charcoal, which fuel, or its equivalent, constitutes the generating element essential to the operation of the device. 6 is a chute depending from the magazine within the heating compartment. 7 is a receptacle or closed container for the liquid. 8 are coils about the container 7 and connected therewith, said container and coils, constituting in conjunction with the heat producing facilities, a generator, and designed in practice to be charged with ammoniacal solution known as aqua ammonia, which solution, under the influence of heat, is designed to produce gas serviceable, as generally applied in the known systems designed for the same purpose, to promote refrigeration and in the instance of this structure, to supply the power to operate the pump.

The coils 8 are provided as an auxiliary to the receptacle 7 and being the most exposed to heat exposing the most surface thereto, will serve to have generated therein the major quantity of gas produced in the complete generator, and as the liquid within the coils is confined, there is no danger of boiling over as in the instance of the ordinary open container partially filled with liquor. Such boiling over contingency needs to be safeguarded against as the buffing and jarring of the cars is very productive of such boiling over effect.

9 is an analyzer communicating through pipe 10 with the container 7. The ammonia that is distilled off in the generator passes through pipe 10 into the analyzer where the gas is dried or any moisture that it contains is caught and returned to receptacle 7. The gas passes from the analyzer 9 through pipe 11 to the condenser 12, the latter comprising an expanse of piping members exposing large radiating surface which serves to cool the gas and reduce it to a liquid state under the pressure of the generator and the resistance of a valve disposed to control the outlet from said condenser. The liquefaction is complete within the head member 13, and is thus converted into anhydrous ammonia under pressure, liquefied, and is then in a state to perform refrigerating work. 14 are refrigerating coils. 15 and 16 are pipe members constituting a connection between the condenser and the refrigerating coils, within which connection there is interposed a specially constructed automatic expansion valve 17, hereinafter to be more particularly described. The ammonia liquid is permitted to escape from the condenser through valve 17 under conditions of a pressure from the generator approximating 80 lbs., such pressure being partially essential to liquefaction of the gases and also necessary in the operation of the system to operate the pump. The liquid passing from the condenser into the refrigerating coils performs the refrigerating work in the ordinary and known manner.

Reference character 17 indicates an automatic expansion valve, which admits liquid anhydrous ammonia from the liquid header of the condenser into the refrigerating coils at a predetermined and regulatable pressure, thereby determining not only the quantity of ammonia admitted to these coils, but also the temperature at which they will be maintained, by reason of closing at the pressure corresponding to the temperature at which is desired the refrigerating coils shall remain. The liquid ammonia is admitted through a small pipe to the inlet of said valve and passes down through channelways 18; thence through a channelway 19 in a closure and seat member 20 at the lower extremity of a vertical central opening 21 in the main lower body portion 22 of the valve; thence through an exit 23 at the upper end of said opening for communication with the extended chamber 24, within which there is extended a flexible or diaphragm valve member 25. The channelway 19 is controlled against outlet by a ball 26, and the outlet 23 is controlled against inflow by ball 27. A spring member 28 is interposed between a perforated head member 29 and the ball 26 and is of such resiliency as to cause a resistance of 80 lbs. to the opening of the valve formed by the ball 26, thus preventing gas flowing from the generator from entering the refrigerating coils under a pressure of less than 80 lbs. In this way the gas in the condenser is reduced until liquefaction approaches and the pump is started. The ammonia upon passing by the ball 26 and into the opening 21 of the valve, is permitted to flow through channelway 30 into pipes 15 and 16, and from thence into the refrigerating coils 14. Ball 27 which controls the entrance to passageway 23 is held off its seat by valve stem 31 under normal conditions of pressure. The valve stem 31 constitutes the lower extremity of a threaded screw member 34 which operates in connection with diaphragm 25. Member 34 is held under the resiliency of spring 36, its resiliency being controlled by a threaded member 37 coöperating with a similar threaded member in the upper end of head member 38 of the valve and the position of the valve stem 31 is adjustable and determined through and by means of the hand wheel 39 and the actuation of the screw member 32 within nut 33 connected with the diaphragm. In this way an adjustment of the valve stem may be had at will. Under abnormal pressure within the refrigerating coils, that is to say, at a pressure above 30 lbs., the back pressure exerted upon diaphragm 25 will serve to raise valve stem 31 against the force of spring member 36 to relieve ball 27, thus allowing the ball to close the exit opening and in this manner shut off the flow of liquid anhydrous ammonia until the pressure within the refrigerating coils falls below 30 lbs. Under the conditions of efficient refrigerating pressure within the refrigerating coils, the gases liberated therefrom, after effecting the refrigerating work, pass therefrom through pipe 40 in a gaseous state into the absorber 41.

The pressure of the gases resulting from generation within the generator causes the weak liquor to be expelled from the generator and delivered to the absorber. The particular connection or train of connections effective to accomplish this transfer comprises the pipe member 42, which leads from compartment 7, the pipe members 43, a temperature exchanger member 44 (the purposes and functions of this member are hereinafter to be more particularly described) connecting pipe member 45, a pump exhaust absorber 46 (the purposes and functions of which will be hereinafter more partciularly explained), connected coil or cooling members 47 and pipe member 48. Within the exhaust connection from the generator to the absorber is interposed a valve 49 between connecting pipe member 45 and pump exhaust absorber member 46, said valve being set to be actuated under a pressure in excess of 30 lbs. Also, the communicating end of the pipe member 48 that leads into the absorber is provided with a spray member 50. The conditions, then, under which transfer of weak liquor from the generator to the absorber occurs, are that under a pressure within the generator and the connection therefrom with the pump exhaust absorber in excess of 30 lbs., valve 49 will be opened and the weak liquor will be discharged into the pump exhaust absorber 46 and ultimately be discharged through spray nozzle 50 into the absorber 41, where it mixes with the gases coming from the refrigerating coils and discharges into the absorber. The temperature of the weak liquor and the gases will thus be equalized and lowered and become converted into a normal liquid solution serviceable for replenishing the generator, thus within the same piping circuit, two distinct and separate supplies of ammonia gas are introduced and absorbed independent of each other and each without affecting the pressure of the other, thus constituting a compound absorber, performing a progressive absorption. The spray nozzle 50 (see Fig. 3) is employed specially to separate the fluid particles into as fine a state as possible, that it may more readily absorb the gases flowing from the refrigerating coils into the absorber, and thus expedite liquefaction, the temperature exchange from within and without the absorber also serving to promote liquefaction.

Connections to facilitate the return of the rich liquor accumulated within the absorber to the generator are provided, comprising pipe members 51 and 52, the latter continued for connection with pipe member 53, which communicates with connections leading to compartment 7 and coils 8 of the generator. There is interposed in this connection the circulating pump which is generally referred to as 54 and is of a common type serviceable for similar purposes. Through the actuation of the circulating pump the rich liquor accumulated within the absorber is transferred to the generator.

Pump 54 is adapted to be driven from the ammonia gas developed in the generator and the connection for effecting the pump action comprises pipe member 55 leading, as shown, indirectly from the generator through the analyzer, through the pump regulator 56 to the pump cylinder. The pump regulator or control includes a float mechanism associated with a throttle operating in the well known way, liquid in the pump control chamber being supplied through a pipe member 57 communicating with and leading from the weak liquor connection between the generator and the absorber.

The gas under pressure for operating the pump is supplied from the generator through the pipe 55 to the chamber of the regulator 56. The level of liquids in this chamber is the same as the level in the generator, and the regulator chamber is so positioned that a space is left above the liquid level as shown in Fig. 1. A pipe 55' leading from the upper portion of this chamber space to the power cylinder of the pump has interposed in its length a throttle or shut-off valve 55$^a$ which is reciprocated to close the valve when the liquid level rises to its maximum height by float 55$^b$, disposed within the chamber and connected to a rock shaft 55$^c$, which is also linked to the valve. Since the supply of liquor to the generator is stopped when the pump is shut off by the rising of the float 55$^b$, it will be evident that a substantially constant liquid level will be maintained in the generator. The pump control merely operates to control the pumping action within limits that the normal supply only of rich liquor may be pumped into the generator members 7 and 8, and acts to cut out the pumping action when the desired normal level of liquor is attained.

When the rich liquor is pumped through the pipe connections from the absorber to the generator it is admitted to the generator members comprising container 7 and coils 8 through a return member 53$^a$, said member being best shown in Fig. 4 of the drawings. The upper leg of this member connects directly with coils 8. The other member connects with a pipe member 54$^a$ which communicates with the lower portion of compartment 7. Under normal conditions, and if the inflow capacity of both legs of member 53$^a$ were the same, the larger quantity of liquor would pass through leg 54$^a$ as there would be less resistance through this member than through the coils. This double discharge member is specially provided to meet a condition that will permit the major flow of liquor through coils 8 and only a restricted flow through member 54$^a$. This arrangement of double connection with compartment 7 is provided to meet a condition where the pump may be stopped from some cause and to afford a means of flow from the compartment to the coils through member 54$^a$, until a normal level within the coils and the compartment is attained, thus serving to maintain equal liquid level in the coils and in the compartment, which will prevent damage from overheating of either of these members during the period when the pump action is suspended. To accomplish the purpose of restricting the supply of rich liquor passing through member 54$^a$ and to permit a return flow under the circumstances above named, I have provided the restricting diaphragm member 55$^a$, the same being provided with a small perforation 56$^a$.

In the operation of this, as well as other systems for like purposes, wherein gases are expelled from a liquid solution and again re-combined, it is essential that the gases and the weak liquor that are designed for recombination in the absorber shall be brought, during their course to the absorber, to a temperature state best adapted to facilitate their ready union and conversion into a rich liquor solution, and to this end heretofore water cooling jackets have been interposed in the system to effect this purpose. In the instance of my present structure, such water temperature exchanger means is eliminated and air cooling combined with the cooling effect from the spray nozzles is depended upon wholly to bring about the modification respectively of the temperature of the gases and the weak liquor, and as a general aid to the end of air cooling, I have multiplied expansion surfaces to the limit consistent with practical embodiment, and further in aid I have provided the specially designed temperature exchanger 44. This member 44, it will be observed, is merely a housing piping for as much of the rich liquor communicating pipe that leads from the absorber to the generator as may be found practical in building, and in operation the liquor coursing from the absorber to the generator and that passing from the generator to the absorber are caused to pass in counter-current direction, which results in a gradual and proportionate absorption of heat from the weak liquor solution by the cooler or cold rich liquor, thus serving the principal purpose of reducing the temperature of the weak liquor passing to the absorber, and incidentally pre-heating the liquor passing from the absorber to the generator so that when it reaches the generator, being already partially heated, it will more quickly act under the influence of the heat of the generator to liberate the ammonia gas. It will be observed that the temperature exchange member 44, which conveys the the weak hot liquor, is carried about the piping through which the rich liquor courses, thus enabling a presentation of an enlarged surface to the air to facilitate extended radiation and air cooling of the weak hot liquor solution.

My refrigerating and heating system is designed largely for service in connection with cars used for transportating fruits, vegetables, meats and the like. These cars in service are required to travel long distances and are subject in transit to very little, if any, opportunity of control of the system or replenishment of the liquid solution necessary to carry out the working of the system, therefore it is absolutely essential that there shall be no loss or diminution of the initial supply of such liquid solution.

Having introduced a pump in the system to convey the rich liquor from the absorber to the generator, it necessarily must have an exhaust. I have provided means for saving the exhaust and furthermore, means for utilizing the same for useful purposes. The means to this end includes a connection between the pump cylinder and the pump exhaust absorber, and the particular connecting means comprises pipe member 58 leading from the cylinder; pipe 59; jacketing pipe 60 which surrounds and incloses pipe member 52 which conducts the cool or cold liquor from the absorber to the generator, and which we will designate for convenience of description and understanding as a pump exhaust temperature exchanger; and pipe 61 leading to the pump exhaust absorber. In operation the exhaust gases from the pump cylinder pass through pipe members 58 and 59 to the pump exhaust temperature exchanger 60, where it courses in a direction opposite to the flow of the rich liquor through pipe 52 to pipe 61, and from thence into the pump exhaust absorber 46 into which latter member it discharges.

I have found in practice and in the use of the generated ammonia gases for operating the pump that if, during low weather temperatures the exhaust port in the power end of the pump, were unrestricted, the action in said cylinder and other pump was quite similar to that in the refrigerating coils, that is, that because of the gas not being thoroughly dry and being partially liquefied, and hence having some entrained moisture in it, that this moisture would freeze on the walls of the cylinder, causing the piston to stick. To remedy this defect and to make the pump operable under all weather conditions, I have provided means, as a coupling 58$^a$ interposed between pipe members 58 and 59 provided with a restricted passageway 59$^a$. The effect of this restriction of the exhaust is to create a back pressure having correspondingly higher temperature than the freezing point of water, therefore when the ammonia gas becomes liquefied in what is ordinarily called the steam chest of the cylinder, and is admitted to the power cylinder proper to perform the work of moving the piston when the exhaust port opens, then because of the restricted exhaust opening, a sufficient back pressure is maintained in the cylinder to prevent the formation of frost upon the cylinder walls, and therefore danger of obstruction by frost formation is obviated.

The temperature of the exhaust gas discharging into the pump exhaust absorber is higher than the weak liquor solution that is being discharged into the absorber, and to the end that the gases shall be best absorbed by the liquor, I have provided a specially formed spray nozzle 49 which is best shown in Fig. 3. This spray nozzle is constructed of plural spiral veins 62 and an extended conical member 63. The spiral veins serve to divide or split up the inflowing body and to impart a rotary motion thereto, and the conical tip or member is provided to prevent cross currents or eddies being formed at the discharge end of the nozzle and serve this purpose by properly deflecting the flow from the spirals. The ultimate result of producing a rotary action, and the prevention of cross currents and eddies is that the fluid is discharged into the pump exhaust absorber in a fine spray, and because of its rotary action, presents or leaves an open central core, and within the latter the incoming exhaust gases are projected throughout substantially the length of the absorber and hence, through the sprayed form of the liquor and the wide surface of contact presented, ready and quick absorption of the gases is permitted. In this manner provision is made for the saving and the absorption of the hot gases under treatment that quickly reduces their temperature and effects their ready and prompt absorption by the weak liquor.

To the end of reducing the temperature of the weak liquor solution after it has been combined with the exhaust gases in the pump exhaust absorber, and to dissipate the heat of absorption thus created, the pump exhaust and the weak liquor from the generator are caused to flow through a series of coils 47 of sufficient area and length for the atmosphere to cool their contents to weather temperatures. Now, as heretofore indicated, the liquor leaving these coils, known as weak liquor coolers, is a comparatively weak solution and is now injected through the spray nozzle 50 into the main absorber, and thus the cycle of operation with respect to the transfer of weak liquor in the generator to the absorber is the same, regardless of the interposition or injection of the pump exhaust into the circuit.

It is known that all absorption machines with temperature exchangers will partially accommodate themselves to variations in temperature of the condenser water. I mean by this that when the condenser water is at a high temperature, consequently requiring a higher pressure to liquefy the ammonia, the temperature exchanger will give up a corresponding amount of additional heat to the hot liquor to assist the generator in creating the increased pressure necessary to liquefy, or *per contra*, if the condenser water is comparatively low in temperature, reverse action will occur and a less pressure will be created, corresponding with the pressure of liquefaction for the lower temperature condenser water. As my machine is primarily designed for refrigerating car service and is entirely air cooled, using no condensing water, and as these cars are continually passing through wide ranges of climatic temperatures, it is primarily necessary that such pressure and temperature balances be created by means of temperature exchanges and spray nozzles as will automatically and efficiently bring to and take from heat for the generator to automatically equalize the pressure to effect the desired liquefaction in the condenser under varying climatic temperatures. Hence my absorption process balances itself automatically with varying climatic temperatures.

My system for refrigerating and heating is designed to be automatically convertible to perform these two distinct functions. When the apparatus is operating as a heating system, the structural combination effective for carrying out the refrigerating purposes is similarly effective for heat generation and dissemination, except that the condenser is entirely cut out of the system, that is, the valve 17 serves to prevent any communication from the heating system to the condenser and the thermostatic valve 70 is provided to control the flow of gases through the three-way valve 71, and under the conditions of the system being used for refrigeration purposes, it closes the by-pass connection through pipe 72 with pipe 15, which leads to coils 14 and opens the valve to permit flow of gases from the generator through the pipe connections to the condenser. Then under conditions of the use of the system for heating purposes, the valve closes against the communication from the generator to the condenser and opens to establish communication between the generator and by-pass pipe 72. This valve is located in the cooling chamber where the refrigerating coils 14 are arranged and is operated thermostatically by temperature variations in the chamber so as automatically to effect this conversion. The system is further modified when operating as a heating system in respect to the provision of valve 73 in the pipe connection 40 between coils 14 and absorber 41, which serves normally as a retainer or differential valve. It is set at 60 lbs. and closes when the pressure in the absorber is above 60 lbs. It is provided for the purpose of preventing the gas in the generator, when it is by-passed by the condenser and cut into coils 14, from blowing directly into the absorber, which action if permitted would destroy the differential in pressures between the absorber and the generator, and allow them to equalize, in which event the pump would have no force to drive it. It is to obviate this contingency that valve 73 is provided. The valve 70 being closed against admission of gases to the condenser and the automatic expansion valve 17 being set to close when the pressure in the refrigerator coils is above 30 lbs. then when valve 70 by-passes the condenser and permits the gas to flow directly to coils 14, it creates a greater pressure than 30 lbs., therefore the valve 17 automatically closes and as the pressure rises until 60 lbs. is reached in the absorber, the valve 73 closes and thus the pressure in the refrigerating coils will continue to rise until generator pressure is reached and the valve 73 thus serves to maintain a lower pressure in the absorber than in the refrigerating coils and the generator, thus creating a differential in pressure sufficient to continue to drive the pump.

The generating, absorption and pumping operation being the same as that described in connection with the operation of the system for refrigerating purposes with the exception of the elimination of the condenser when being used for heating purposes, it is thought unnecessary to enter into further detail description of the device in its application as a heating system.

What I claim is:

1. In a system of the character described including a generator, a condenser, refrigerating coils and an absorber, the combination of a pump for returning rich liquor from the absorber to the generator, means for supplying gas under pressure from the generator to the pump for operating the same, and means actuated by variations in the liquid level in the generator for controlling the supply of gas to said pump.

2. In a system of the character described including a generator, a condenser, refrigerating coils and an absorber, the combination of a pump for returning rich liquor from the absorber to the generator, means for supplying gas under pressure from the generator to the pump to operate the same, and float controlled mechanism actuated by variations of the liquid level in the generator for controlling the supply of gas from the generator to the pump.

3. In a system of the character described including a generator, a condenser, refrigerating coils and an absorber, the combination of a pump for returning rich liquor from the absorber to the generator, means for supplying gas under pressure from the generator to the pump for operating the same, means for regulating the operation of said pump so as to maintain a substantially uniform liquid level in the generator, and means for delivering exhaust gas from said pump into the weak liquor *en route* from the generator to the absorber.

4. In a system of the character described including a generator, a condenser, refrigerating coils and an absorber, the combination of a pump for returning rich liquor from the absorber to the generator, means for supplying gas under pressure from the generator to the pump for operating the same, and means for mingling the exhaust gas from the pump with the stream of weak liquor *en route* from the generator to the absorber.

5. In a system of the character described including a generator, a condenser, refrigerating coils and an absorber, the combination of a pump for returning rich liquor from the absorber to the generator, means for introducing exhaust gas from the pump into the stream of weak liquor flowing from the generator to the absorber, and means for converting said stream into a spray to facilitate the absorption of said exhaust gas by said stream.

6. In a system of the character described including a generator, a condenser, refrigerating coils and an absorber, the combination of a pump for returning rich liquor from the absorber to the generator, means for supplying gas under pressure from the generator to the pump to operate the same, means for delivering exhaust gas from the pump to the weak liquor delivered from the generator, and means for transferring a portion of the heat units of said exhaust gas to the rich liquor delivered by the pump.

In testimony whereof I have affixed my signature in presence of two witnesses.

WILLIAM M. BAXTER.

Witnesses:
D. N. GEHRIG,
A. J. KLEINSCHMIDT.